(12) United States Patent
Aposhian et al.

(10) Patent No.: US 11,825,777 B2
(45) Date of Patent: Nov. 28, 2023

(54) TUNING SYNCHRONIZING VARIABLES BASED ON A SOD HARVESTER'S SPEED

(71) Applicant: FireFly Automatix, Inc., Salt Lake City, UT (US)

(72) Inventors: Steven R. Aposhian, Farmington, UT (US); Eric E. Aston, Farmington, UT (US); William M. Decker, Salt Lake City, UT (US); Mark C. LeBlanc, Sandy, UT (US); Daniel A. Aposhian, West Valley City, UT (US)

(73) Assignee: FireFly Automatix, Inc., Salt Lake City, UT (US)

( * ) Notice: Subject to any disclaimer, the term of this patent is extended or adjusted under 35 U.S.C. 154(b) by 287 days.

(21) Appl. No.: 17/070,768

(22) Filed: Oct. 14, 2020

(65) Prior Publication Data
US 2022/0110272 A1    Apr. 14, 2022

(51) Int. Cl.
*A01G 20/15*    (2018.01)

(52) U.S. Cl.
CPC .................................. *A01G 20/15* (2018.02)

(58) Field of Classification Search
CPC ........ A01G 20/15; A01G 20/12; B65G 47/31; B65G 43/08; B65G 47/52; B65G 2207/14; B65G 43/10; Y10S 242/03
See application file for complete search history.

(56) References Cited

U.S. PATENT DOCUMENTS

| | | | | |
|---|---|---|---|---|
| 4,518,075 A * | 5/1985 | Aykut | ................ | B65H 31/3054 198/460.1 |
| 4,629,058 A * | 12/1986 | Reissmann | ........ | B65H 31/3054 198/577 |
| 5,004,094 A * | 4/1991 | Brandt | ................... | B65G 43/08 198/460.1 |
| 5,038,915 A * | 8/1991 | Delsanto | ................ | B65G 47/31 198/460.1 |
| 5,123,231 A * | 6/1992 | Fallas | .................... | B65G 47/31 53/538 |
| 6,347,697 B1 * | 2/2002 | Ouellette | ............... | B65G 43/08 198/369.5 |
| 6,513,641 B1 * | 2/2003 | Affaticati | ............... | B65G 43/08 198/444 |
| 6,540,063 B1 * | 4/2003 | Fallas | .................... | B65B 5/105 198/460.1 |
| 6,918,588 B2 * | 7/2005 | Muller | ................... | B65H 29/66 271/283 |
| 7,021,584 B2 * | 4/2006 | Hendriks | ............... | A01G 20/15 242/534 |
| 7,264,063 B1 | 9/2007 | Dover | | |

(Continued)

OTHER PUBLICATIONS

International Searching Authority, International Search Report and the Written Opinion, dated Mar. 1, 2022.

*Primary Examiner* — Gregory W Adams
(74) *Attorney, Agent, or Firm* — Kirton McConkie; Brian Tucker

(57) ABSTRACT

Synchronizing variables can be tuned based on a sod harvester's speed. A sod harvester's control system can include a tuning component that receives as input a current speed of the sod harvester. The tuning component can apply logic to the current speed to calculate values for synchronizing variables that are tuned for the current speed. In this way, the sod harvester can be operated with precision across a range of speeds, including at high speeds.

20 Claims, 14 Drawing Sheets

(56) References Cited

U.S. PATENT DOCUMENTS

| | | | |
|---|---|---|---|
| 7,681,712 B2* | 3/2010 | Hara | B65G 47/31 |
| | | | 198/577 |
| 8,813,861 B2* | 8/2014 | Stefanski | A01G 20/15 |
| | | | 172/19 |
| 9,078,390 B2* | 7/2015 | Aposhian | A01G 20/15 |
| 9,648,797 B2* | 5/2017 | Sammut | A01G 20/15 |
| 9,688,476 B1* | 6/2017 | Tvetene | B65G 21/2054 |
| 9,894,824 B2* | 2/2018 | Aposhian | A01G 20/15 |
| 10,155,632 B2* | 12/2018 | Aposhian | B65B 5/105 |
| 2001/0035332 A1 | 11/2001 | Zeitler | |
| 2009/0171501 A1* | 7/2009 | Hills | G05B 19/4189 |
| | | | 702/150 |
| 2014/0350719 A1* | 11/2014 | Fleischmann | B65G 43/08 |
| | | | 702/173 |
| 2015/0225183 A1 | 8/2015 | Luz et al. | |
| 2020/0305358 A1 | 10/2020 | Aposhian et al. | |

* cited by examiner

TUNING SYNCHRONIZING VARIABLES BASED ON A SOD HARVESTER'S SPEED

CROSS-REFERENCE TO RELATED APPLICATIONS

N/A

BACKGROUND

Turf grass (sod) is a living organism that must be handled properly to ensure its survival when it is removed from one location and transplanted to another. Sod is generally harvested using large machinery such as sod harvester 100 shown in FIG. 1 and sod harvester 200 shown in FIG. 2. Sod harvesters 100 and 200 are both in the form of a tractor and include a cutting head 101, 201 that cuts slabs of sod from the ground, inclined conveyor(s) 102, 202 that elevate the slabs from the ground towards a stacking conveyor 103, 203, a stacking head 105, 205 that is mounted to a support mechanism 104, 204, and a pallet dispenser 106, 206 that is positioned adjacent a pallet support (not visible) on which stacking head 105, 205 stacks slabs that it has removed from stacking conveyor 103, 203.

Two general types of harvesters exist: slab harvesters such as sod harvester 100; and roll harvesters such as sod harvester 200. A roll harvester forms the slabs of sod into rolls (e.g., utilizing a roll forming mechanism 207) which are then accumulated on the stacking conveyor for pick up. A slab harvester, on the other hand, directly stacks the slabs in their flat form.

A key consideration when harvesting sod is the speed at which the sod harvester can be driven. Generally speaking, operating the sod harvester at a higher speed reduces the cost of harvesting sod. However, it is very difficult to configure the various components of a sod harvester to support operating a sod harvester at higher speeds. This is particularly true given the number of moving parts and the critical timing at which these parts must be moved to produce a well-formed stack of sod. As one example only, if the process of forming a roll is off by even a few milliseconds when operating at high speeds, the resulting roll may be misoriented or incompletely rolled which may prevent a balanced pallet from being formed.

BRIEF SUMMARY

The present invention extends to techniques for tuning synchronizing variables based on a sod harvester's speed. A sod harvester's control system can include a tuning component that receives as input a current speed of the sod harvester. The tuning component can apply logic to the current speed to calculate values for synchronizing variables that are tuned for the current speed. In this way, the sod harvester can be operated with precision across a range of speeds, including at high speeds.

In some embodiments, the present invention may be implemented as a method for controlling a sod harvester. It can be determined that the sod harvester is travelling at a first speed. A value of at least one synchronizing variable can then be set based on the first speed. It can then be determined that the sod harvester is travelling at a second speed. The value of the at least one synchronizing variable can then be set based on the second speed.

In some embodiments, the present invention may be implemented as sod harvester that includes a cutting head, one or more inclined conveyors, a stacking conveyor, a stacking head and a control system that is configured to control the stacking conveyor using at least one stacking conveyor synchronizing variable. The control system includes a tuning component for tuning the at least one stacking conveyor synchronizing variable to a speed at which the sod harvester is travelling.

In some embodiments, the present invention may be implemented as a method for controlling a sod harvester. Components of the sod harvester can be controlled in accordance with a first set of values for synchronizing variables. A current speed of the sod harvester can be monitored. Upon determining that the current speed of the sod harvester has changed, the components of the sod harvester can be controlled in accordance with a second set of values for the synchronizing variables.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

In this specification, the term "sod harvester" should be construed as machinery that is configured to receive and stack sod that has been cut from the ground. This machinery could be in the form of a vehicle, such as a tractor, or in the form of a trailer that is pulled by another vehicle. The term "synchronizing variables" should be construed as any variable employed by a sod harvester's control system to calibrate the operation of a component of the sod harvester including to synchronize the operation of multiple components. For example, a synchronizing variable may define a time offset for triggering one component based on another component's position or speed, a speed of one component relative to another component's position or speed, a position offset of one component relative to another component's position or speed, etc.

The term "control system" should encompass any combination of hardware and/or software. For example, a control system may be hardware- and/or software-based circuitry including, but not limited to, a central processing unit, a microprocessor, a microcontroller, a field programming gate array, an application-specific integrated circuit, a system on a chip, etc.

A sod harvester on which embodiments of the present invention may be implemented may be configured to employ a number of synchronizing variables. The specific types and sets of synchronizing variables that may be employed on any particular sod harvester may vary based on a number of factors. The following description provides an overview of how synchronizing variables may be used on one example slab harvester and one example roll harvester. However, these examples should not be viewed as limiting embodiments of the present invention. Instead, embodiments of the present invention should extend to techniques for tuning any set of one or more synchronizing variables on any sod harvester.

Figure 1:
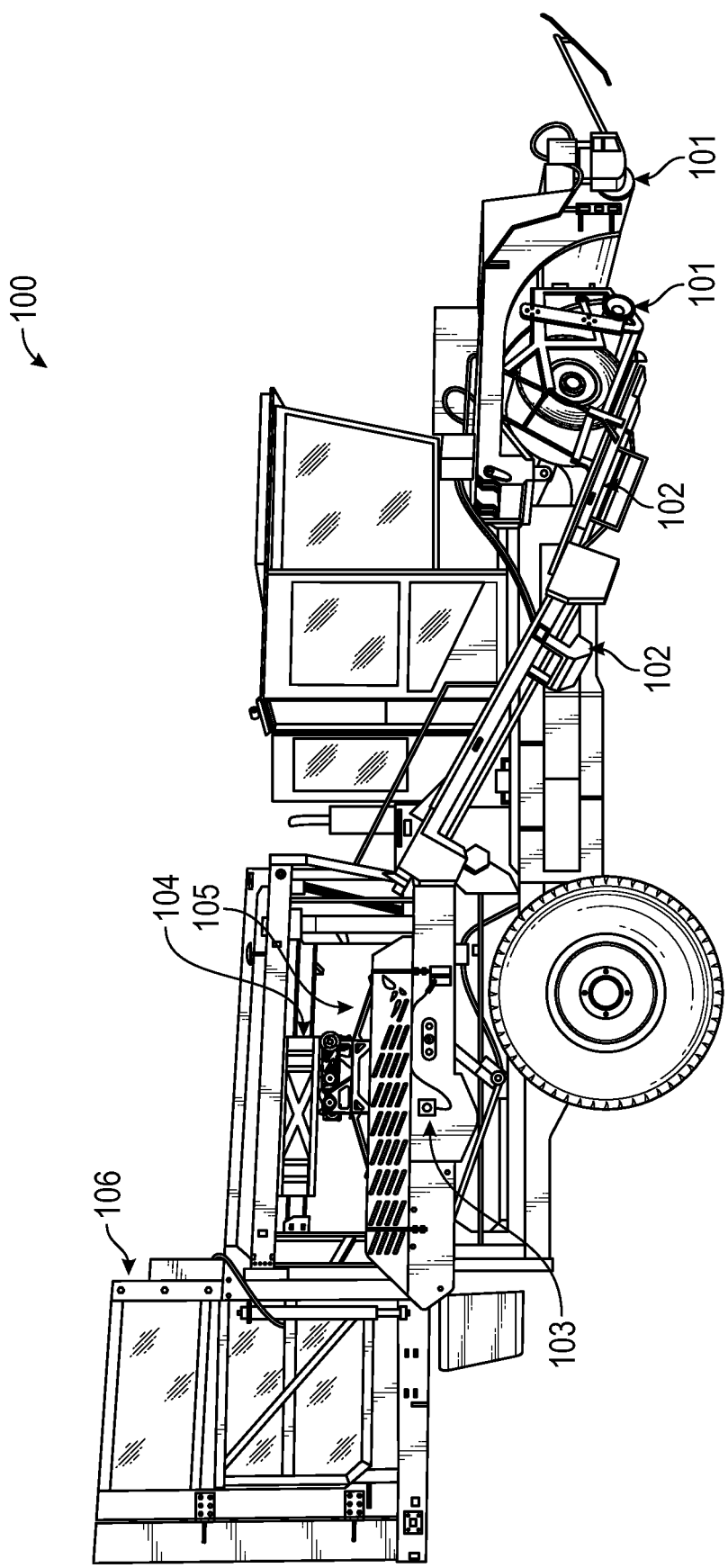
FIG. 1 illustrates a prior art sod harvester that harvests sod in slabs.
Figure 2:
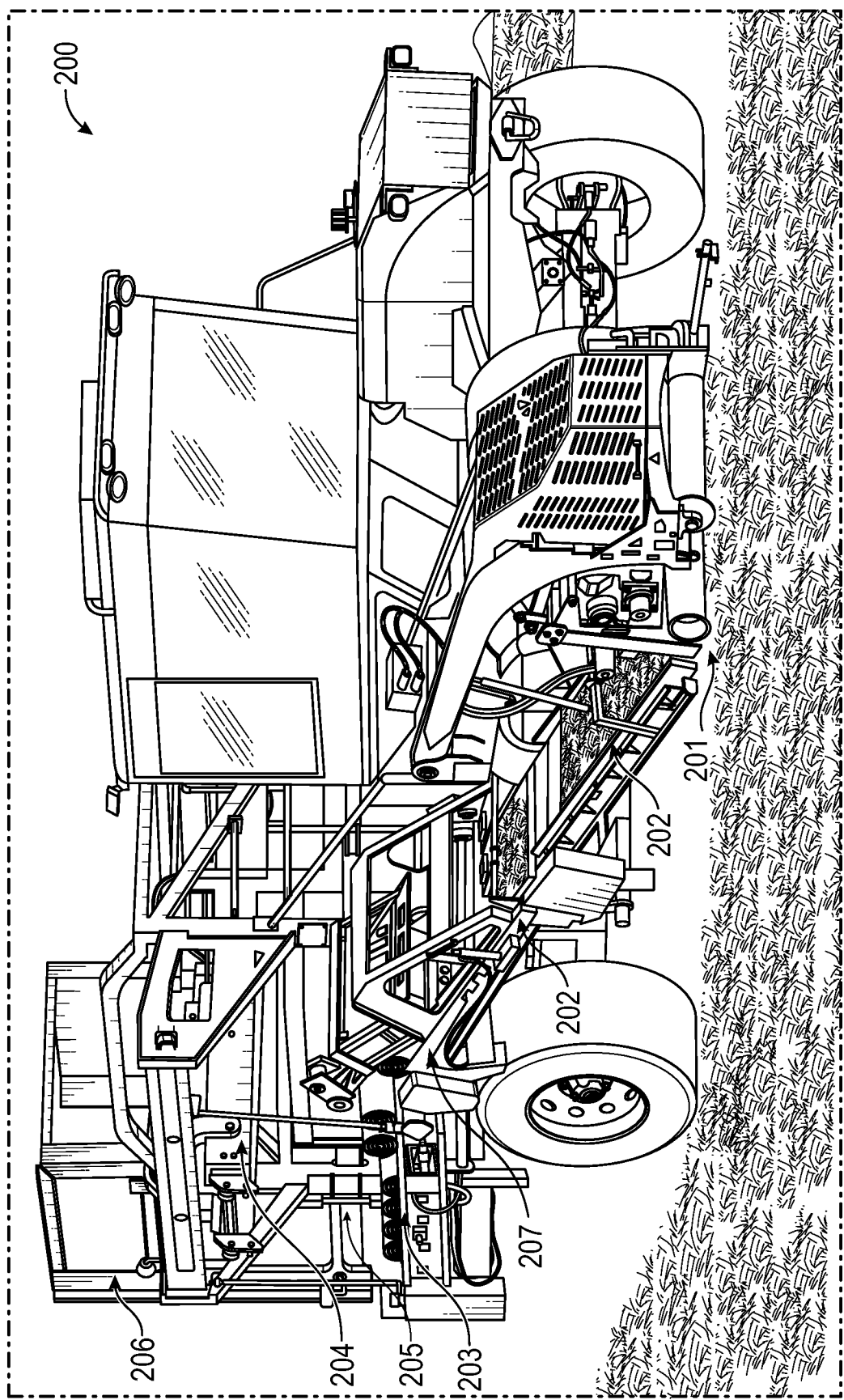
FIG. 2 illustrates a prior art sod harvester that harvest sod in rolls.

Both slab harvesters and roll harvesters will typically employ one or more inclined conveyors (e.g., inclined conveyors 102 and 202 in FIGS. 1 and 2 respectively) that transport slabs of sod from the ground to the stacking conveyor. The speed at which the inclined conveyors are operated typically must be set based on the ground speed of the sod harvester. Accordingly, the speed of the inclined conveyors, and therefore the speed/rate at which slabs are advanced up the inclined conveyors, may vary during harvesting as the sod harvester's ground speed is varied. To synchronize other components with the speed of the inclined conveyor(s), the sod harvester's control system may employ synchronizing variables and correlate their values with the speed of the inclined conveyor(s).

Figure 3A:
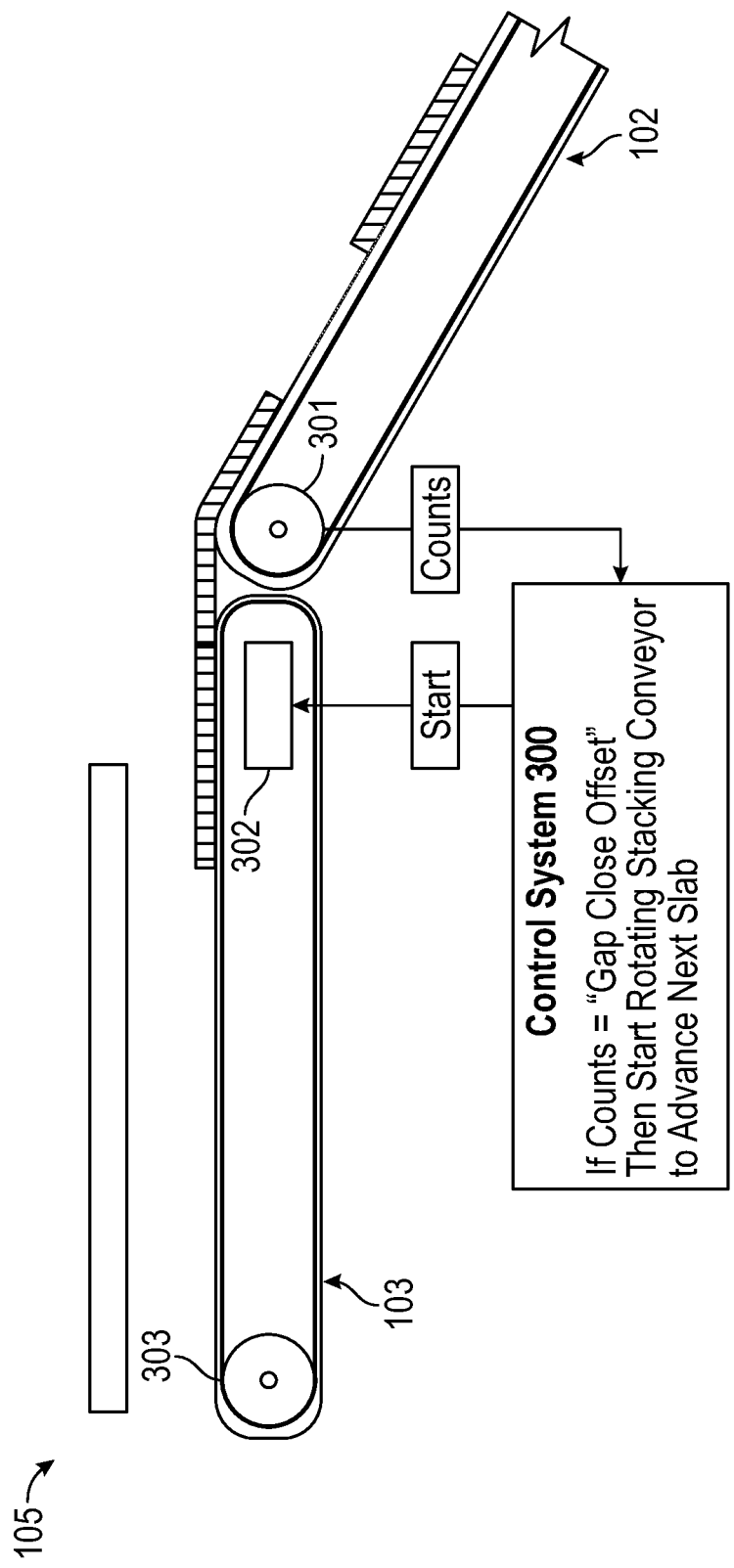
FIGS. 3A-3C represent how a control system on a slab harvester may employ various synchronizing variables.
Figure 3B:
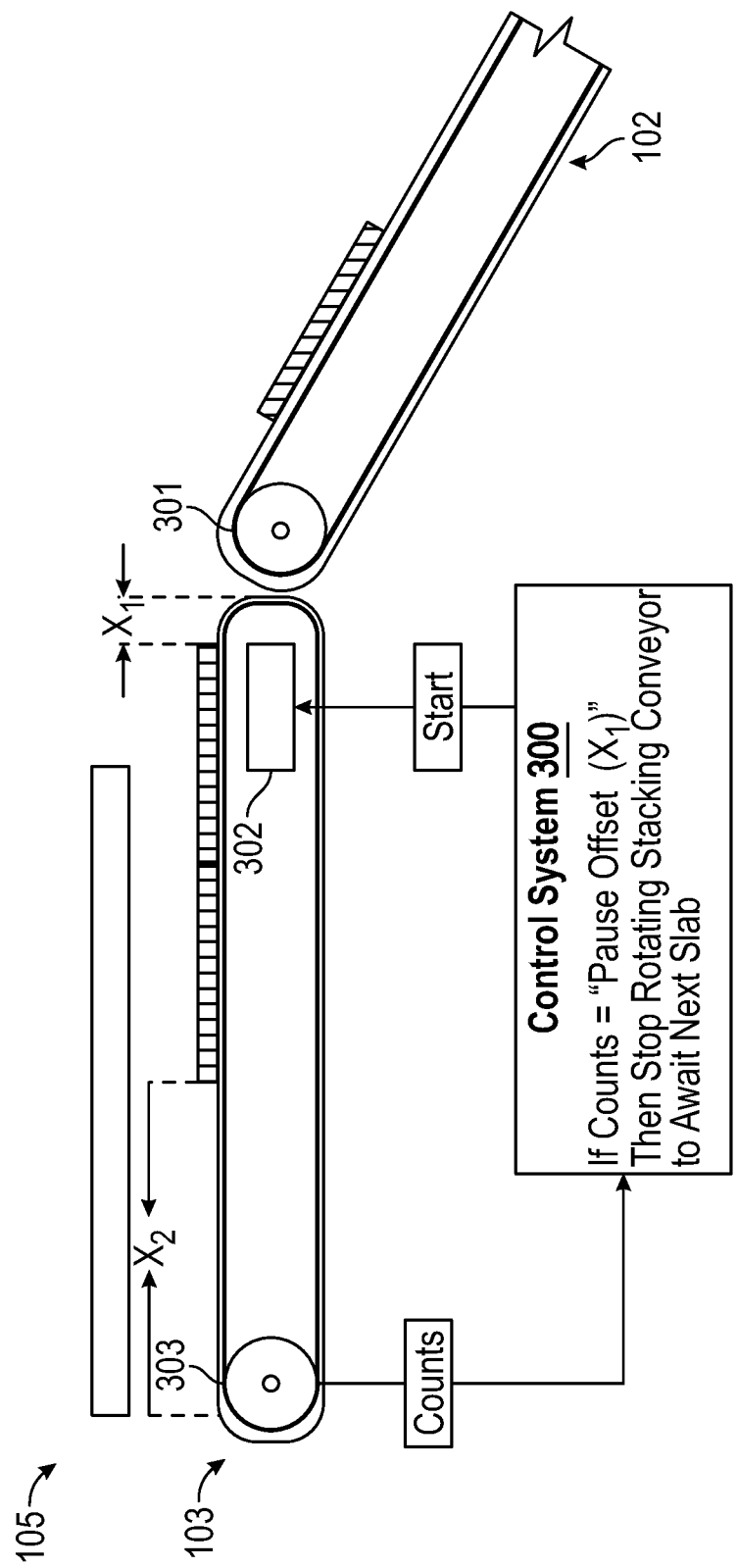
Figure 3C:
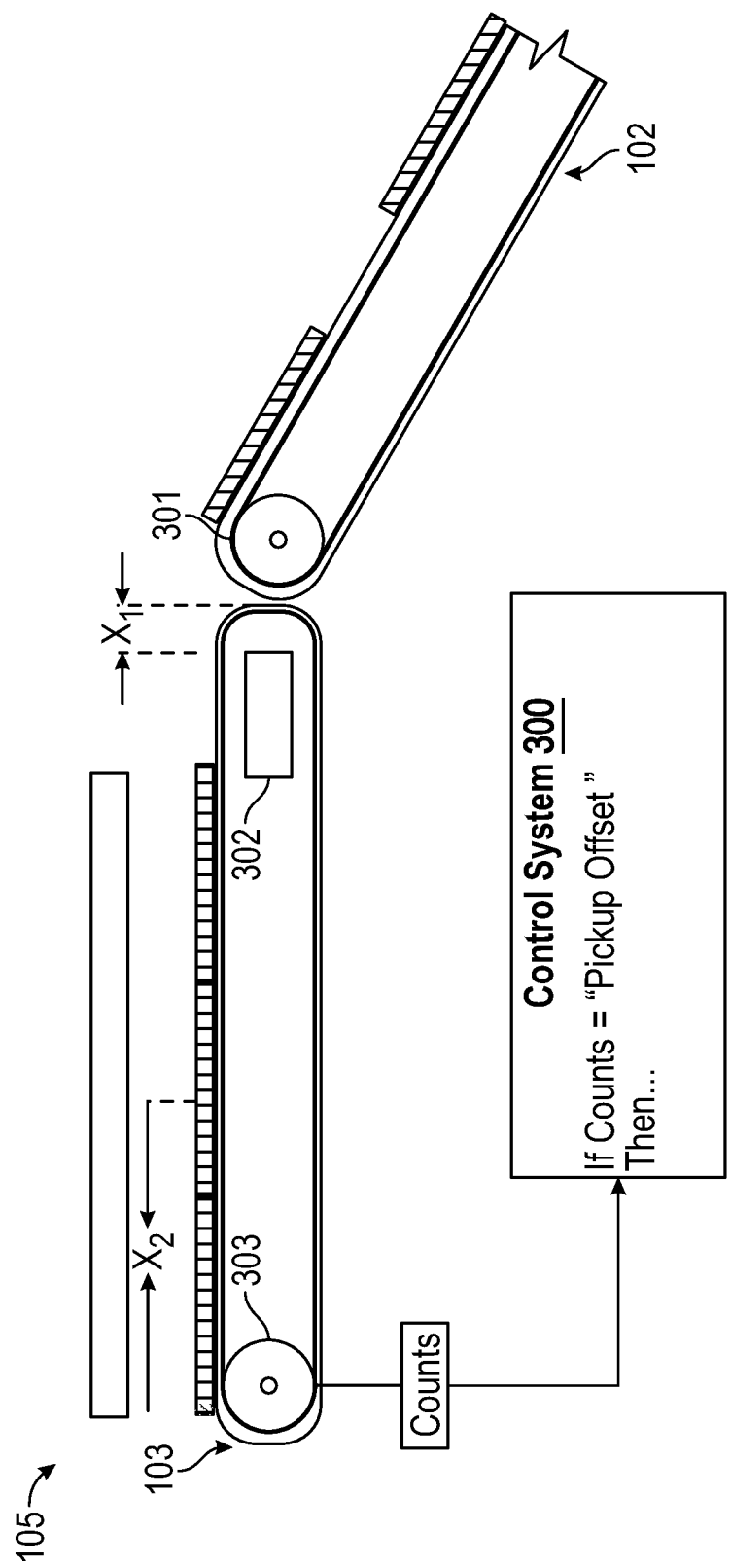

FIGS. 3A-3C provide examples of synchronizing variables that may be employed on a slab harvester, such as slab harvester 100, that is configured to accumulate slabs of sod on the stacking conveyor. U.S. Pat. No. 9,078,390, which is incorporated herein by reference, describes some slab accumulation techniques that could be performed by a sod harvester configured to implement embodiments of the present invention.

FIG. 3A shows inclined conveyor 102, stacking conveyor 103 and stacking head 105 along with a control system 300. Control system 300 is configured to interface with an encoder 301 of inclined conveyor 102 to receive position information of inclined conveyor 102 (e.g., counts). Accordingly, control system 300 can employ the counts it receives from encoder 301 to track a position of inclined conveyor 102, or more specifically, to track the position of slabs of sod on inclined conveyor 102.

As described in detail in U.S. Pat. No. 9,078,390, stacking conveyor 103 can be started and stopped (or slowed) while inclined conveyor 102 continues to rotate to thereby accumulate slabs of sod on stacking conveyor (i.e., to close the gap between the slabs). Control system 300 can maintain a "gap close offset" synchronizing variable which it uses to determine when to start rotating stacking conveyor 103 so that a trailing slab advancing on inclined conveyor 102 will be adjacent to a leading slab that is already positioned on the stopped (or slowed) stacking conveyor 103. As represented, control system 300 may correlate the counts of encoder 301 with the gap close offset to make this determination. Once the counts of encoder 301 reach the gap close offset, control system 300 can instruct drive 302 to start rotating stacking conveyor 103.

FIG. 3B represents how control system 300 may employ a "pause offset" synchronizing variable to determine how far to advance stacking conveyor 103 before it is stopped to await the next slab to be accumulated. This position or distance is represented as $X_1$ in FIG. 3B and can be viewed as the distance between the trailing edge of the slab and the front edge of stacking conveyor 103 when the stacking conveyor 103 is paused (or slowed) to await the next slab. Control system 300 may receive counts from an encoder 303 of stacking conveyor 103 to determine when stacking conveyor has reached this pause offset and may then instruct drive 302 to stop rotating stacking conveyor 302.

FIG. 3C represents how control system 300 may employ a "pickup offset" synchronizing variable to control the timing of a pickup/stacking operation. The pickup offset can be viewed as the distance, $X_2$, that stacking conveyor 103 is advanced to cause the accumulated slabs to be positioned beneath stacking head 105. Control system 300 employs counts received from encoder 303 of stacking conveyor 103 to determine when the accumulated slabs have reached this position. Control system 300 may take a number of actions in response to the counts reaching the pickup offset. For example, control system 300 could use the pickup offset to determine when to drive stacking head 105 and/or to determine when to stop stacking conveyor 103 (e.g., if stacking conveyor 103 is stopped during the pickup operation). To summarize, each of the gap close offset, pause offset and pickup offset synchronizing variables represent a position of a conveyor which control system 300 employs to determine when to drive the same or different conveyor or another component.

Figure 4A:
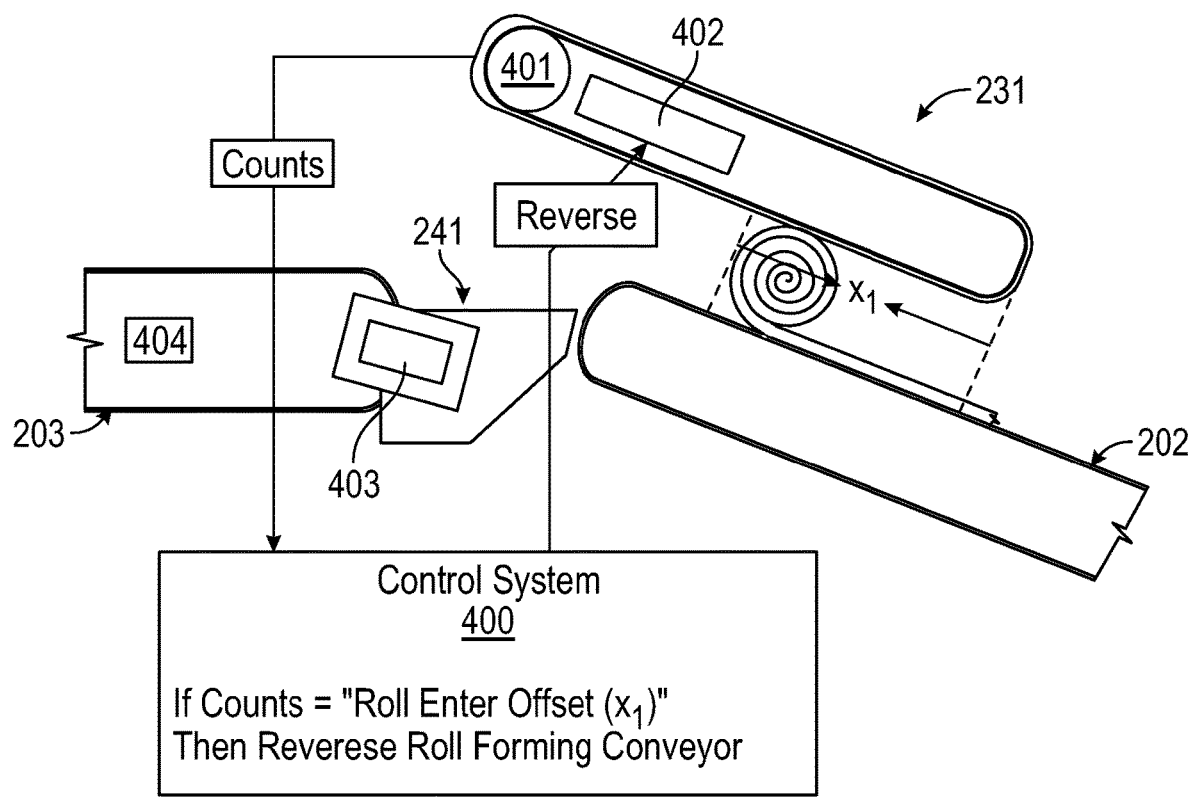
FIGS. 4A-4D represent how a control system on a roll harvester may employ various synchronizing variables.
Figure 4B:
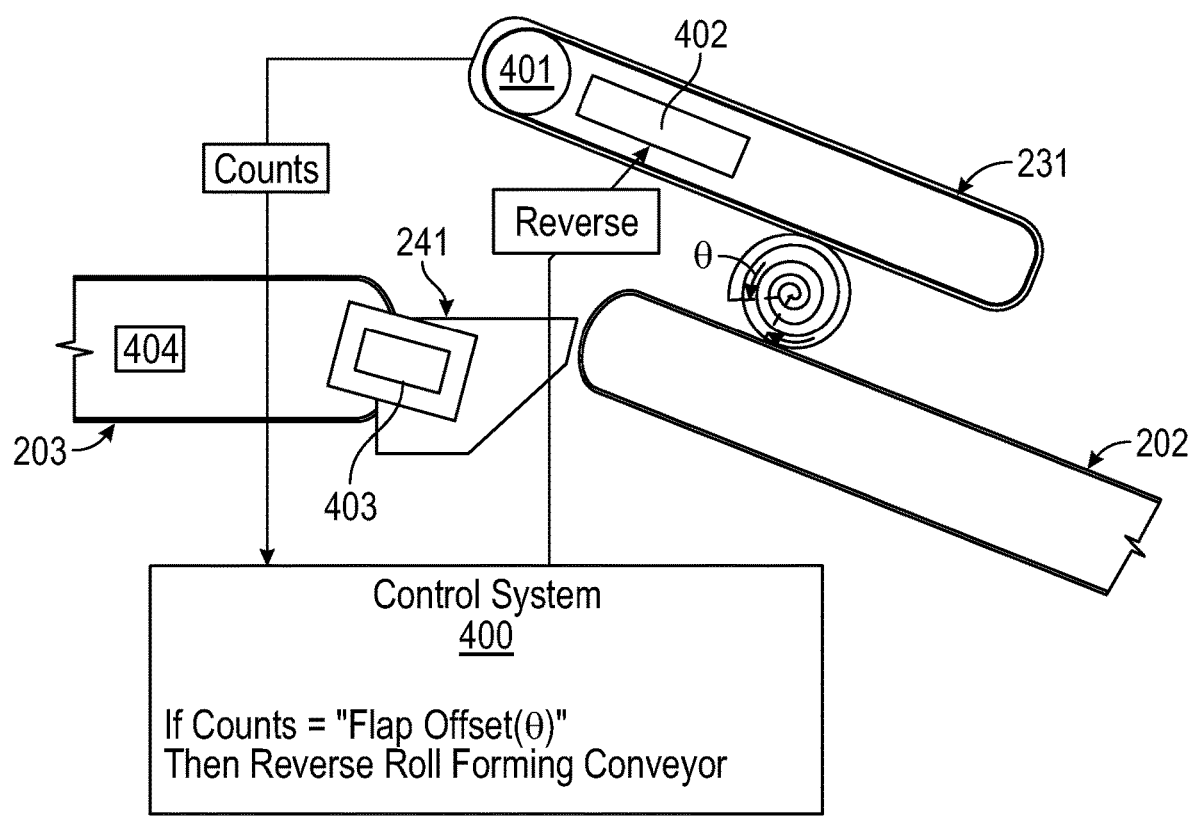
Figure 4C:
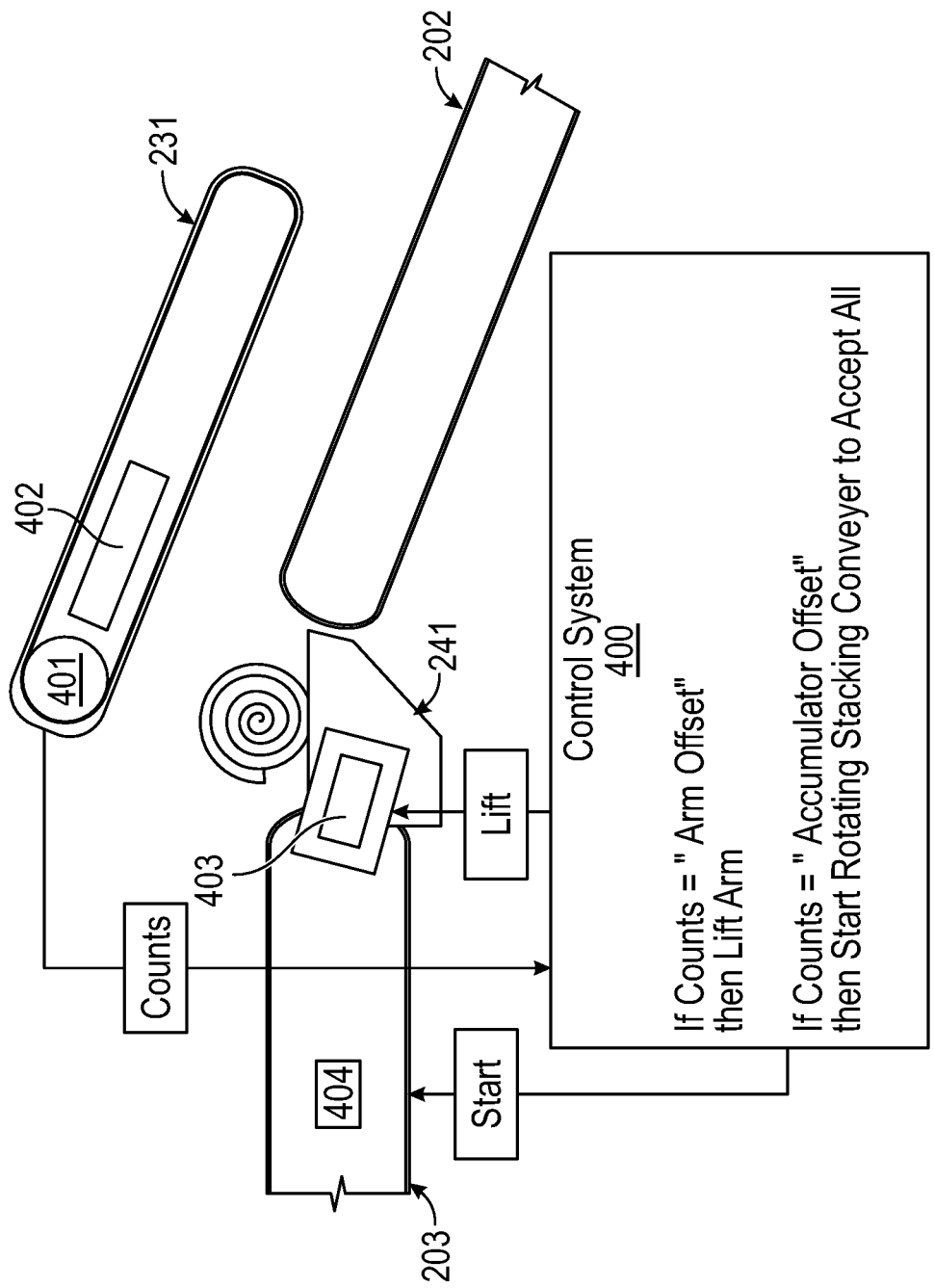

FIGS. 4A-4C provide examples of synchronizing variables that may be employed on a roll harvester, such as roll harvester 200. U.S. patent application Ser. No. 16/370,995, which is incorporated herein by reference, describes some roll forming techniques that could be performed by a sod harvester configured to implement embodiments of the present invention.

FIG. 4A shows inclined conveyor 202, stacking conveyor 203, an upper conveyor 231 of roll forming mechanism 207 and a lift paddle 241, along with a control system 400. Control system 400 is configured to interface with an encoder 401 of upper conveyor 231 to receive position information of upper conveyor 231 (e.g., counts). Control system 400 can employ the counts it receives from encoder 401 to track a position of upper conveyor 231, and more specifically, to determine how far upper conveyor 231 should be advanced to position a forming roll in the appropriate position for completing the roll.

In FIG. 4A, a partial roll is shown as having been advanced a distance $X_1$ under upper conveyor 231. This distance $X_1$ may be relative to the front edge of upper conveyor 231 or any other location along inclined conveyor 202 (e.g., a position of a sensor). In any case, control system 400 may employ a "roll enter offset" synchronizing variable to determine how far upper conveyor 231 should be rotated to cause the forming roll to be advanced to the position in which the roll will be completed. For example, upon detecting the forming roll, control system 400 may track the number of counts of encoder 401 until the counts have reached the roll enter offset. At that point, control system 400 may cause drive 402 to reverse the direction of upper conveyor 231 to thereby cause the forming roll to rotate in place to thereby complete the roll.

FIG. 4B represents how control system 400 may employ a "flap offset" synchronizing variable to determine how far upper conveyor 402 should travel to cause the flap of the completed roll to be oriented in a desired position. The flap offset can be viewed as the distance that upper conveyor 231 must travel in the reverse direction to cause the flap to be rotated θ degrees. Control system 400 may receive counts from encoder 401 (e.g., a number of counts after detecting the trailing edge of a slab) to determine when the counts have reached the flap offset and may then cause drive 402 to reverse the direction of upper conveyor 231 to thereby cause the formed roll to resume advancing towards stacking conveyor 203.

Figure 4D:
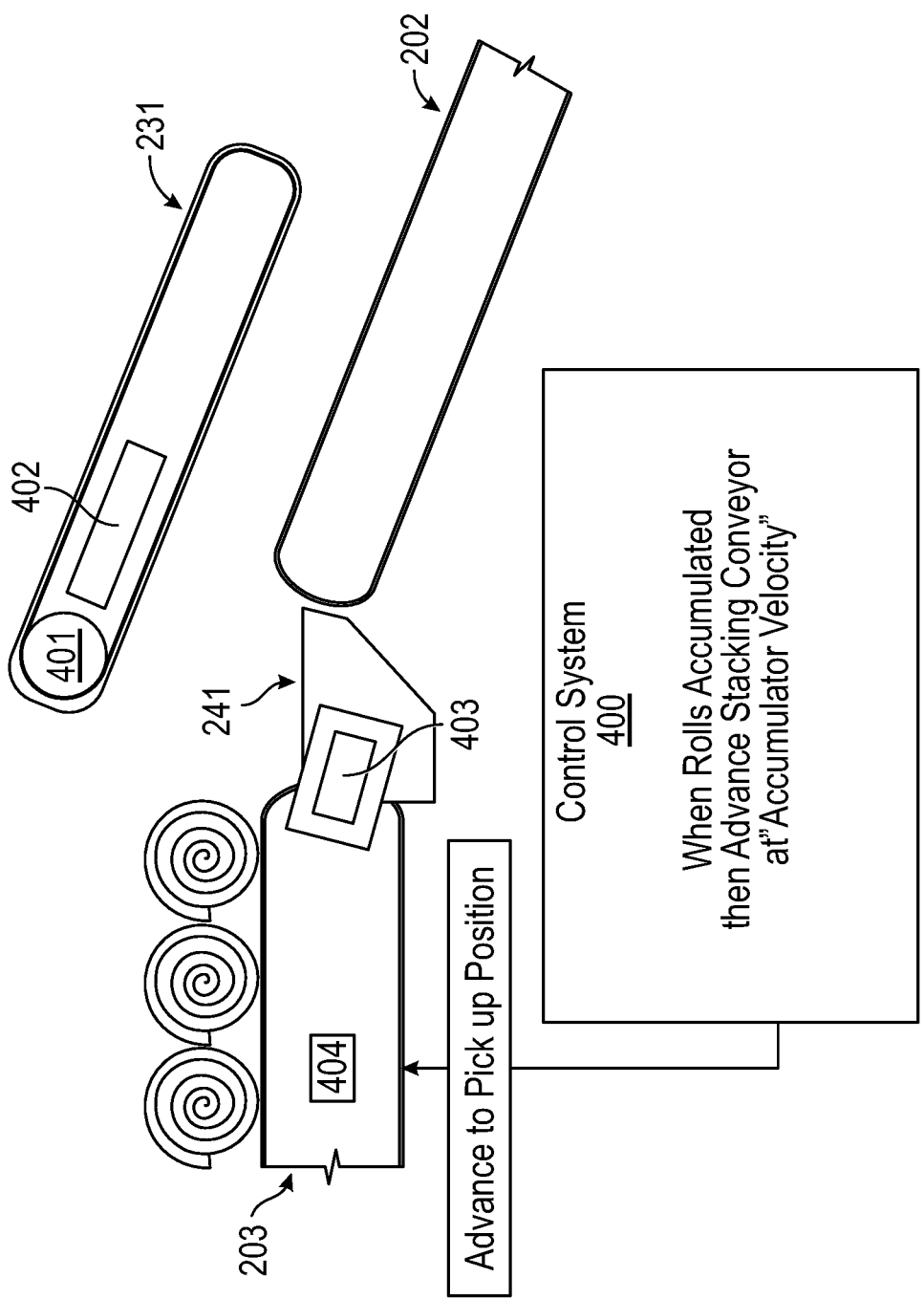

FIG. 4C represents how control system 400 may employ an "arm offset" synchronizing variable and an "accumulator offset" synchronizing variable to synchronize the operation of lift paddle 241 and stacking conveyor 203 to the advancement of the formed roll from inclined conveyor 202. Control system 400 can again track the counts of encoder 401 (e.g., a number of counts after the flap offset has been reached) to determine when the counts have reached the arm offset and the accumulator offset respectively. When the counts reach the arm offset, control system 400 may cause drive 403 to commence lifting lift paddle 241. This timing may coincide with the roll being transferred to lift paddle 241 so that the roll is immediately lifted upwardly towards stacking conveyor 203. When the counts reach the accumulator offset, control system 400 may cause drive 404 to commence rotating stacking conveyor 203. This timing can coincide with lift paddle 241 lifting the roll onto stacking conveyor 203. As represented in FIG. 4D, the accumulator offset can ensure that rolls will be positioned side-by-side on stacking conveyor 203.

FIG. 4D represents that control system 400 can cause drive 404 to rotate stacking conveyor 203 based on an "accumulator velocity" synchronizing variable to advance an accumulated set of rolls under stacking head 205 for pick up. The accumulator velocity is set based on the rate at which rolls are formed and is therefore dependent on ground speed. In other words, the accumulator velocity is set to ensure that the accumulated rolls are advanced quickly enough to allow stacking head 205 to secure the rolls before (or as) stacking head 205 is again advanced to receive the next roll.

To summarize, each of the roll enter offset, flap offset, arm offset and accumulator offset synchronizing variables represent, or are based on, a position of a conveyor which control system 300 employs to determine when to drive the same or different conveyor or another component. On the other hand, the accumulator velocity synchronizing variable does not directly represent a position of the stacking conveyor, but rather how quickly the stacking conveyor needs to travel to reach a particular position.

Figure 5:
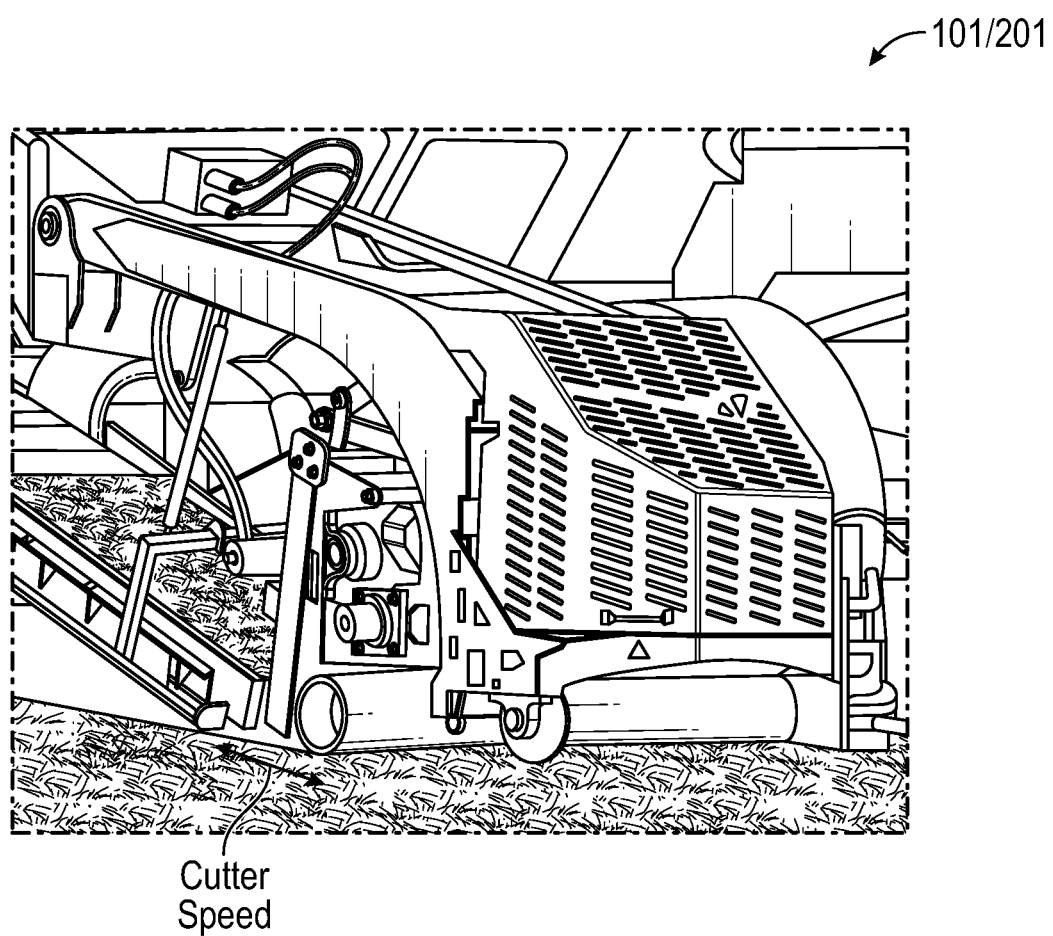
FIG. 5 represents how a control system on a sod harvester may employ synchronizing variables to control the operation of a cutting head.

FIG. 5 represents various synchronizing variables that may be used to control the operation of cutting head 101, 201. Control systems 300 and 400 may be configured to set a "cutter speed" synchronizing variable (i.e., the rate at which the cutter oscillates to sever the sod from the ground), a "boom pressure" synchronizing variable (i.e., how hard the boom pushes down into the ground) and a "head pressure" synchronizing variable (i.e., how hard the head pushes down into the ground). By treating these settings as synchronizing variables, the performance of cutting head 101, 201 can be tuned based on the ground speed of the sod harvester.

In accordance with embodiments of the present invention, a control system on a sod harvester can be configured to dynamically tune a set of one or more synchronizing variables based on the sod harvester's speed. In particular, a control system can set the values of synchronizing variables based on the sod harvester's speed to thereby account for imprecision that would otherwise occur when the sod harvester operates at variable speeds, including lapses in synchronization that would be introduced at higher speeds.

Figure 6:
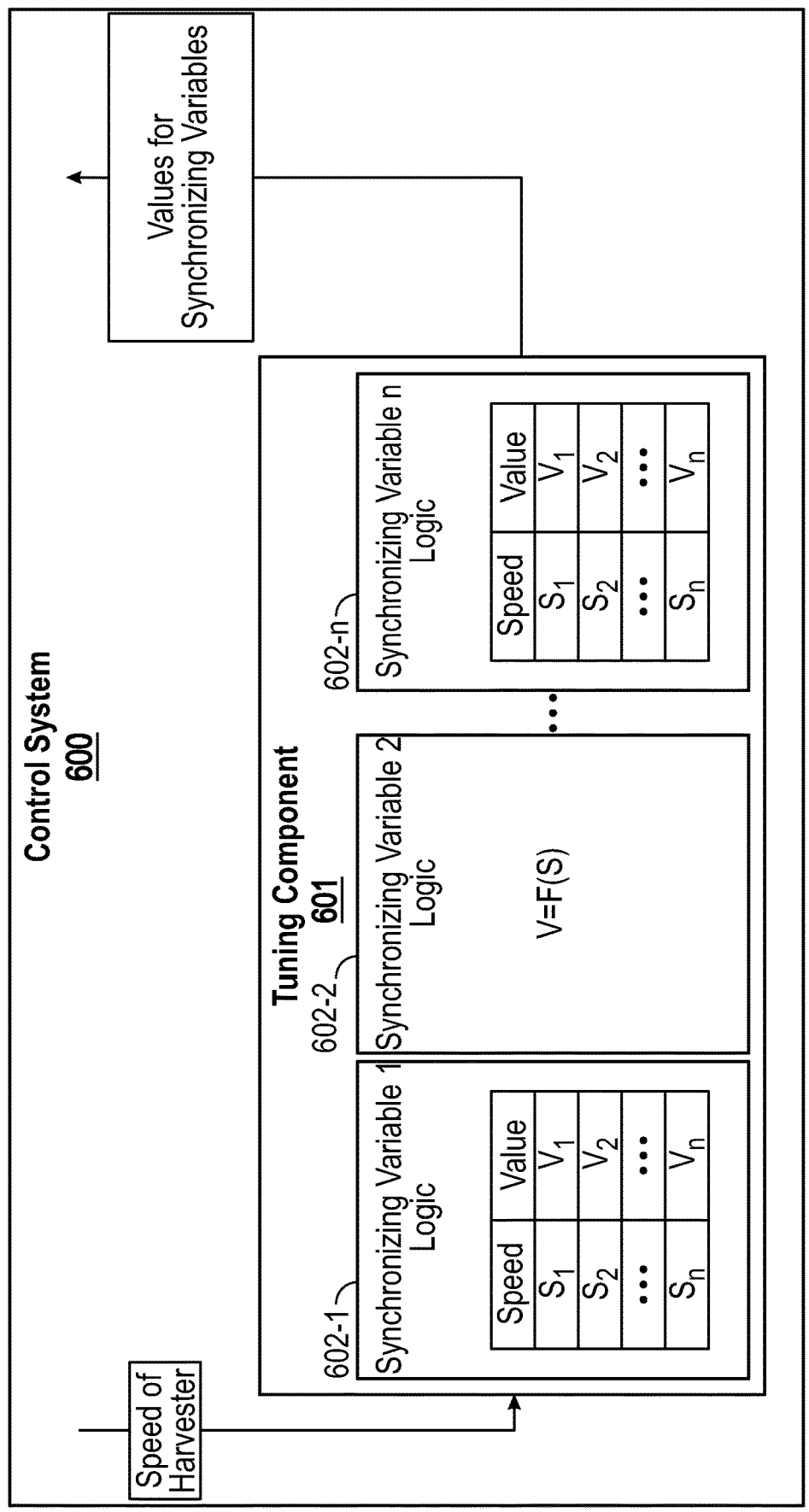
FIG. 6 represents how a tuning component of a control system can output values of synchronizing variables that are tuned to a sod harvester's current speed.

FIG. 6 provides an example of how a control system 600 may be configured to dynamically tune synchronizing variables in accordance with embodiments of the present invention. Control system 600 can be employed on any sod harvester including in place of control systems 300 and 400 of sod harvesters 100 and 200 respectively.

In addition to being configured to utilize synchronizing variables to synchronize or calibrate the operation of the components of a sod harvester, control system 600 can also include a tuning component 601 which defines logic for dynamically tuning one or more synchronizing variables based on the speed of the sod harvester. For example, in FIG. 6, tuning component 601 is shown as defining logic 602-1 for synchronizing variable 1, logic 602-2 for synchronizing variable 2 and logic 602-n for synchronizing variable n. As represented, tuning component 601 may employ different types of logic such as speed/value mappings (logic 602-1 and 602-n) and liner or non-linear functions (logic 602-2).

Tuning component 601 can receive as input a current speed of the sod harvester and use such logic to output values for the synchronizing variables that are tuned to the current speed. This speed of the harvester could be a ground speed and/or a speed of the inclined conveyor(s). In some embodiments, control system 600 may be configured to determine the ground speed of the sod harvester, set the speed of the inclined conveyor(s) based on the ground speed and then input the speed of the inclined conveyor(s) to tuning component 601 to obtain the values for the synchronizing variables.

In some embodiments, the logic that tuning component 601 employs could be generated and updated via a calibration process. For example, a calibration process could be employed on sod harvester 200 to determine which values for the roll enter offset, flap offset, arm offset, accumulator offset and accumulator velocity synchronizing variables provide the best operation at each of a number of different speeds. Speed/value mappings and/or functions could then be created to allow tuning component 601 to output values that are tuned to the current speed at which the sod harvester is travelling. In some embodiments, curve fitting techniques could be employed to generate a function from a number of speed/value pairs.

Figure 6A:
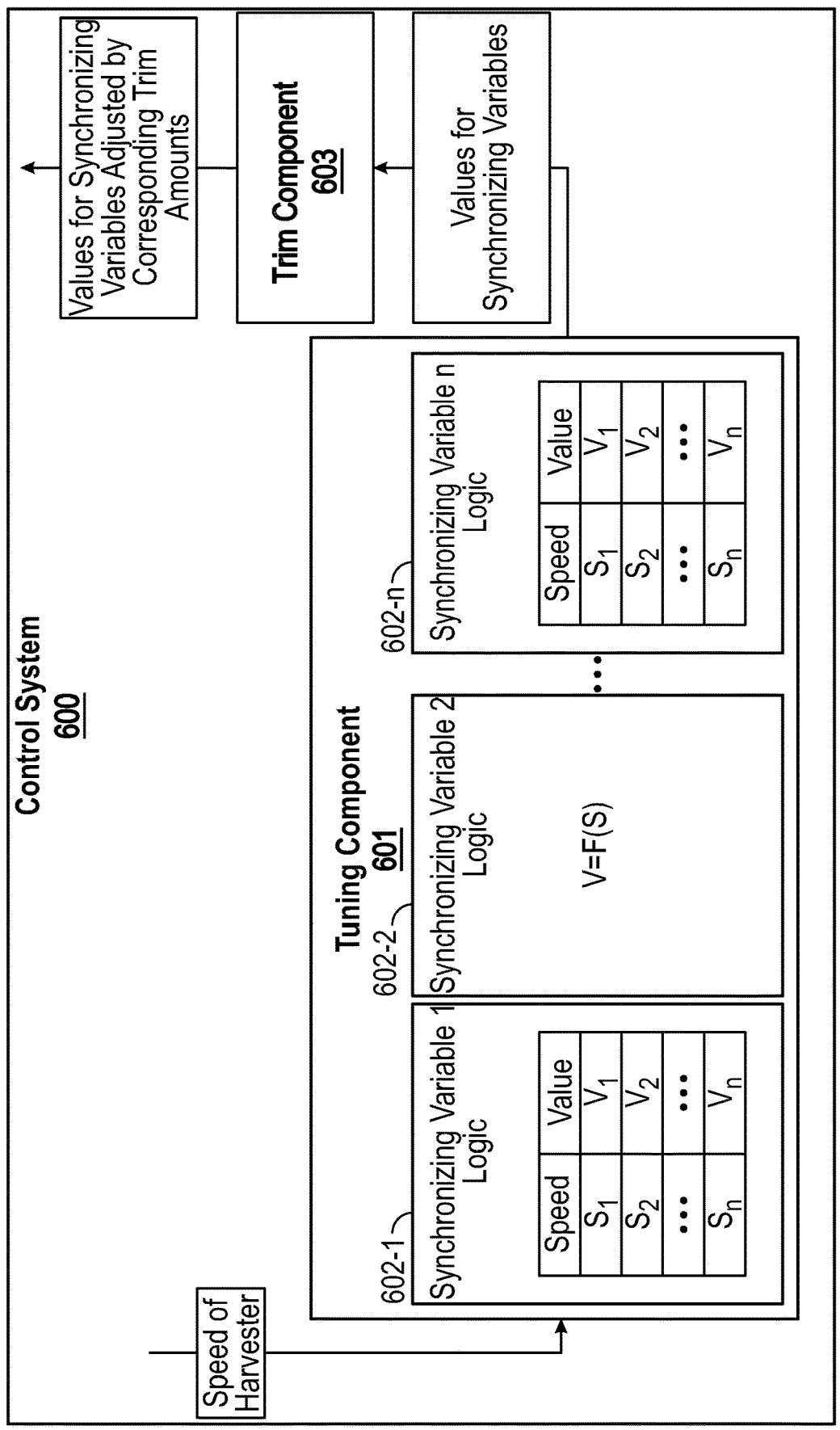
FIG. 6A represents how a trim component can be used in conjunction with the tuning component to apply a trim amount to the values of the synchronization variables that are tuned to the sod harvester's current speed.

In some embodiments, control system 600 may also include a trim component 603 as shown in FIG. 6A. Trim component 603 can be employed to apply a trim amount to the tuned values of the synchronizing variables that are output from tuning component 601. As an example, trim amounts may be defined to account for differences in the harvesting process in wet conditions. In such a case, if the operator turns on the trim functionality (or if it is automatically turned on), trim component 603 can commence adjusting the values of one or more of the synchronizing variables to temporarily adapt the harvesting process to the wet conditions. Notably, these trim amounts may be applied to temporarily adjust the tuned values as opposed to overriding or replacing the tuned values.

Figure 7A:
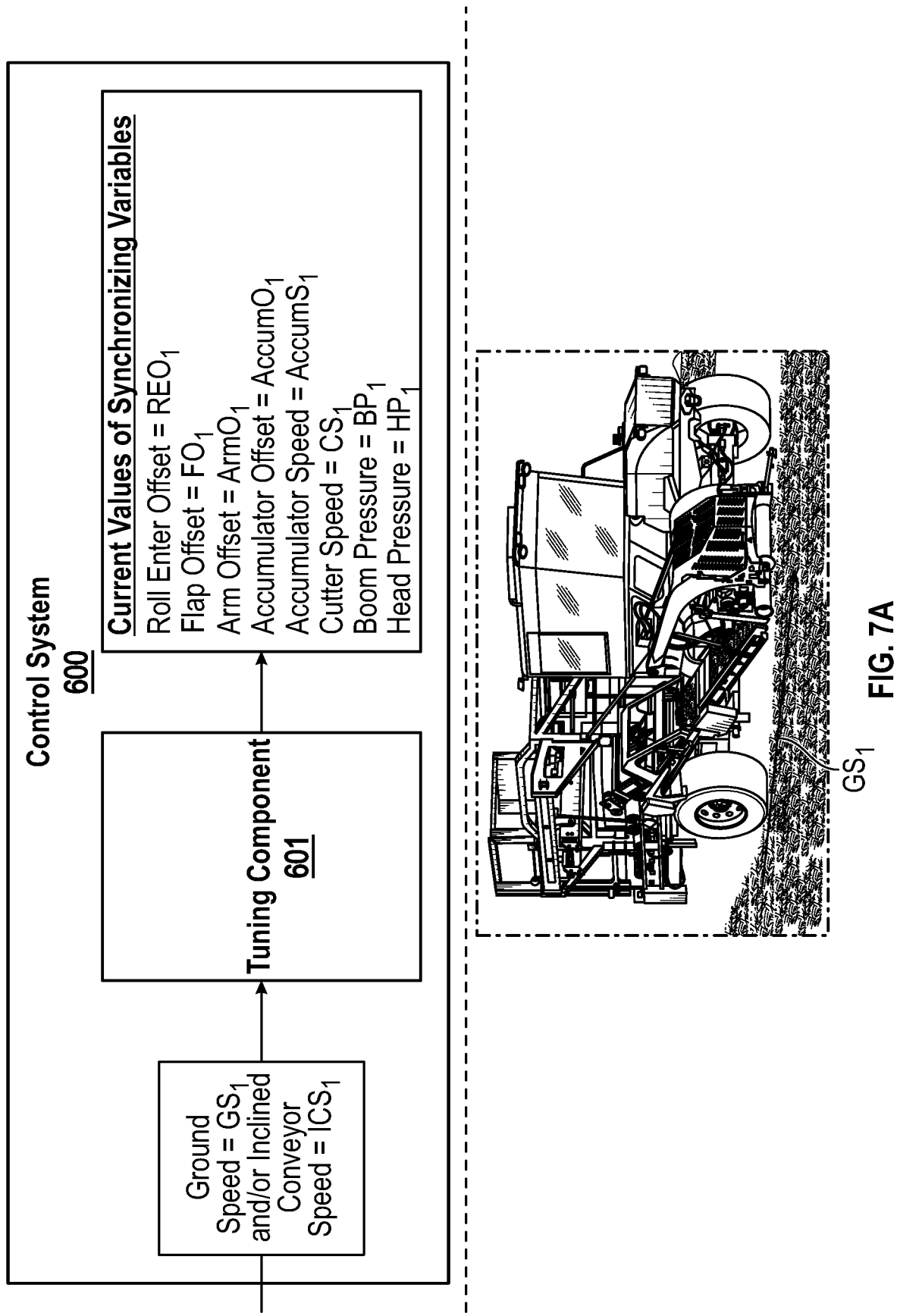
FIGS. 7A and 7B represent how a control system can dynamically update the values of synchronizing variables in response to a change in a sod harvester's ground speed.
Figure 7B:
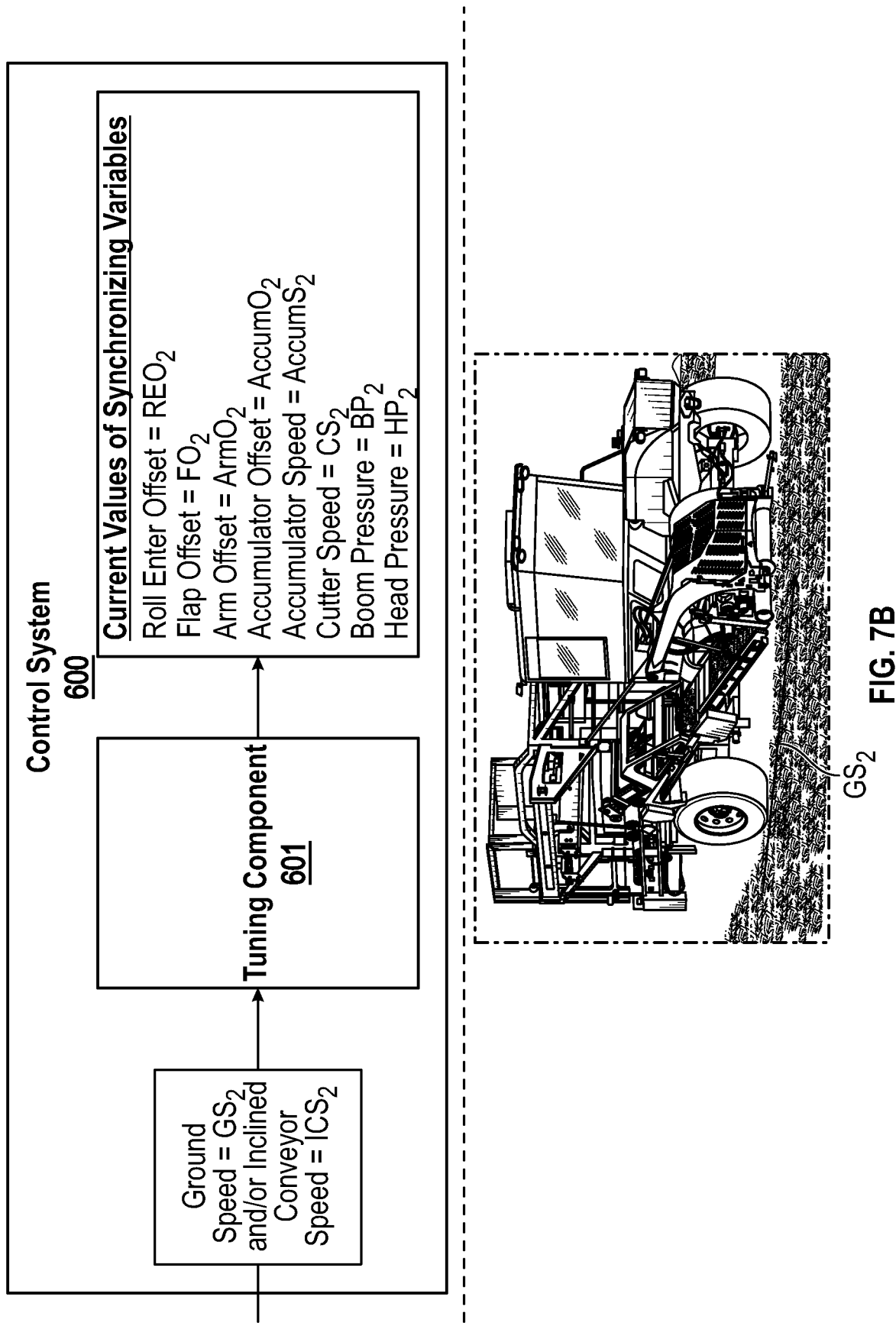

FIGS. 7A and 7B provide an example of how control system 600 may dynamically tune synchronizing variables to the speed of sod harvester 200. FIGS. 7A and 7B are based on the examples provided in FIGS. 4A-4D but can generally represent the dynamic tuning of any set of synchronizing variables to the speed of any sod harvester. In FIG. 7A, it is assumed that an operator has caused sod harvester 200 to travel with a ground speed of $GS_1$. Control system 600 can be configured to identify the current ground speed in any suitable manner. The current ground speed, $GS_1$, and/or a current speed of the inclined conveyor(s), $ICS_1$, which may be set based on the current ground speed, can be provided as input to tuning component 601.

Using logic 602-1 through 602-$n$, tuning component 601 can determine/calculate, from the current ground speed and/or the current speed of the inclined conveyors (or any other indicator of the current speed), the values for the set of synchronizing variables that control system 600 should employ. In this example, it is assumed that, for $ICS_1$, tuning component 601's logic outputs values of $REO_1$, $FO_1$, $ArmO_1$, $AccumO_1$ and $AccumS_1$ for the roll enter offset, flap offset, arm offset, accumulator offset and accumulator speed synchronizing variables respectively. It is also assumed that, for $GS_1$, tuning component 601's logic outputs values of $CS_1$, $BP_1$ and $HP_1$ for the cutter speed, boom pressure and head pressure synchronizing variables respectively. Accordingly, while sod harvester 200 is travelling at the ground speed, $GS_1$, control system 600 will employ these values for the synchronizing variables to control the corresponding components.

Turning to FIG. 7B, it is assumed that the operator has caused the ground speed of sod harvester 200 to be increased to $GS_2$. In response, control system 600 can provide $GS_2$ and/or the increased inclined conveyor speed, $ICS_2$ which it may have derived from $GS_2$, to tuning component 601. By again using logic 602-1 through 602-$n$, tuning component 601 can determine/calculate, from the current ground speed and/or the current speed of the inclined conveyors, the values for the set of synchronizing variables that control system 600 should employ. In this example, it is assumed that, for $ICS_2$, tuning component 601's logic outputs values of $REO_2$, $FO_2$, $ArmO_2$, $AccumO_2$ and $AccumS_2$ for the roll enter offset, flap offset, arm offset, accumulator offset and accumulator speed synchronizing variables respectively. It is also assumed that, for $GS_2$, tuning component 601's logic outputs values of $CS_2$, $BP_2$ and $HP_2$ for the cutter speed, boom pressure and head pressure synchronizing variables respectively. Accordingly, while sod harvester 200 is travelling at the ground speed, $GS_2$, control system 600 will employ these values for the synchronizing variables to control the corresponding components. In this way, control system 600 can dynamically tune the synchronization variables to the sod harvester's speed.

Not all values of the synchronizing variables need to change in the same manner, or even at all, in response to a change in speed. For example, one synchronizing variable's value may increase linearly with speed while another synchronizing variable's value may decrease linearly with speed. Or, a synchronizing variable's value may increase or decrease in steps as the speed passes corresponding thresholds. In short, tuning component 601 can define any type of logic that would cause a set of synchronizing variables to be tuned based on speed.

Although embodiments of the present invention should not be limited by any underlying theory, the following discussion is provided to assist in an understanding of some benefits the present invention may provide. A sod harvester's control system may likely include components that have a fixed response time. For example, a sensor that is employed to detect an edge of a slab may have a delay between the actual occurrence of the edge and the output of a signal indicative of the delay. As another example, there may be a delay between the time when a drive signal is provided to a component and the time when the component physically responds to the drive signal.

Such delays may have a negligible impact at slow speeds but a significant impact at high speeds. In simple terms, operating a sod harvester at high speeds is likely to expose any imprecision in the control system or control process. However, by employing synchronizing variables and dynamically tuning their values to the current speed of the sod harvester, the sod harvester can be operated with precision at any speed, including at high speeds.

Benefits of the present invention are also highlighted when considering prior art techniques. For example, with reference to the process of accumulating slabs on the stacking conveyor, prior art control systems may be configured to advance the stacking conveyor to receive the next slab when the slab is at a fixed distance from the stacking conveyor. At low speeds, this approach may be sufficient to ensure that the slabs are accumulated side-by-side. However, at high speeds, delays in the control system may prevent the stacking conveyor from starting to rotate before the next slab reaches the stacking conveyor. Such prior art techniques would therefore limit the speed at which the sod harvester could be operated, or at least the speed at which it could function satisfactorily. In contrast, a control system configured in accordance with embodiments of the present invention could dynamically adapt the control of the stacking conveyor to account for the current inclined conveyor speed—e.g., to adapt the value of gap close offset to the speed at which the slabs are being delivered to the stacking conveyor.

As another example, in some soil conditions or types, the cutting head may sink into the soil to a greater extent when operating at slower ground speeds. In such cases, if the cutting head is configured for operation at a slow speed and the sod harvester is operated at a fast speed, the cutting head may scalp the sod or otherwise cut it improperly. In contrast, a control system configured in accordance with embodiments of the present invention could dynamically adapt the boom pressure, head pressure and/or cutting speed to prevent scalping and/or overcutting at any speed. Many other examples could also be given. Suffice it to say that embodiments of the present invention enable a control system to dynamically adapt the operation of a wide variety of sod harvester components to tune their operation to the current speed.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:
1. A method for controlling a sod harvester comprising:
   determining that at least one inclined conveyor of the sod harvester is operating at a first speed, the at least one inclined conveyor conveying sod from the ground to a stacking conveyor;
   setting a value of at least one synchronizing variable based on the first speed at which the at least one inclined conveyor is operating, the at least one synchronizing variable comprising at least one of:

a gap close offset;
a pause offset;
a pickup offset;
a roll enter offset;
a flap offset;
an arm offset;
an accumulator offset;
an accumulator velocity;
a cutter speed;
a boom pressure; or
a head pressure;
determining that the at least one inclined conveyor of the sod harvester is operating at a second speed;
setting the value of the at least one synchronizing variable based on the second speed at which the at least one inclined conveyor is operating; and
while the at least one conveyor of the sod harvester is operating at the second speed, controlling at least one component of the sod harvester based on the value of the at least one synchronizing variable that is based on the second speed, the at least one component including one or more of a conveyor of a roll forming mechanism, a lift paddle, or a cutting head.

2. The method of claim 1, further comprising:
determining the value of the at least one synchronizing variable based on the second speed.

3. The method of claim 1, further comprising:
selecting the value of the at least one synchronizing variable based on the second speed.

4. The method of claim 1, wherein setting the value of the at least one synchronizing variable based on the second speed comprises accessing at least one speed/value mapping.

5. The method of claim 1, wherein the speed of the at least one conveyor is based on a ground speed of the sod harvester.

6. The method of claim 1, wherein the at least one component includes a stacking conveyor.

7. The method of claim 6, wherein controlling the stacking conveyor comprises starting or stopping the stacking conveyor.

8. The method of claim 1, wherein the at least one component includes the conveyor of the roll forming mechanism and wherein controlling the conveyor of the roll forming mechanism comprises reversing the conveyor of the roll forming mechanism.

9. The method of claim 1, further comprising:
using a calibration process to determine the value of the at least one synchronizing variable that is based on the second speed.

10. A sod harvester comprising:
a cutting head;
one or more inclined conveyors;
a stacking conveyor;
a stacking head;
a roll forming mechanism; and
a control system that is configured to control the stacking conveyor using at least one stacking conveyor synchronizing variable, the control system including a tuning component for tuning at least one stacking conveyor synchronizing variable to a speed at which the one or more inclined conveyors is operating, the at least one stacking conveyor synchronizing variable comprising at least one of:
a gap close offset;
a pause offset; or
a pickup offset.

11. The sod harvester of claim 10, wherein the control system is configured to control the roll forming mechanism using at least one roll forming mechanism synchronizing variable, and wherein the tuning component tunes the at least one roll forming mechanism synchronizing variable to the speed at which the one or more inclined conveyors is operating, the at least one roll forming mechanism synchronizing variable comprising at least one of:
a roll enter offset;
a flap offset;
an arm offset.

12. The sod harvester of claim 10, wherein the control system tunes the at least one stacking conveyor synchronizing variable by accessing at least one speed/value mapping.

13. The sod harvester of claim 10, wherein the control system employs logic to tune the at least one stacking conveyor synchronizing variable.

14. The sod harvester of claim 10, wherein the control system implements a calibration process to identify a value for each of the at least one stacking conveyor synchronizing variable.

15. The sod harvester of claim 10, wherein the control system dynamically tunes the at least one stacking conveyor synchronizing variable.

16. A sod harvester comprising:
a cutting head;
one or more inclined conveyors;
a stacking conveyor;
a stacking head;
a roll forming mechanism; and
a control system that is configured to control the cutting head using at least one cutting head synchronizing variable, and wherein the control system includes a tuning component for tuning the at least one cutting head synchronizing variable to a speed at which the one or more inclined conveyors of the sod harvester is operating, the at least one cutting head synchronizing variable comprising at least one of:
a cutter speed;
a boom pressure; or
a head pressure.

17. The sod harvester of claim 16, wherein the control system tunes the at least one cutting head synchronizing variable by accessing at least one speed/value mapping.

18. The sod harvester of claim 16, wherein the control system employs logic to tune the at least one cutting head synchronizing variable.

19. The sod harvester of claim 16, wherein the control system implements a calibration process to identify a value for each of the at least one cutting head synchronizing variable.

20. The sod harvester of claim 16, wherein the control system dynamically tunes the at least one cutting head synchronizing variable.

* * * * *